US007328340B2

(12) United States Patent
Zimmer et al.

(10) Patent No.: US 7,328,340 B2
(45) Date of Patent: Feb. 5, 2008

(54) METHODS AND APPARATUS TO PROVIDE SECURE FIRMWARE STORAGE AND SERVICE ACCESS

(75) Inventors: Vincent J. Zimmer, Federal Way, WA (US); Carl M. Ellison, Portland, OR (US); Michael A. Rothman, Gig Harbor, WA (US); Andrew J. Fish, Gig Harbor, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 10/608,326

(22) Filed: Jun. 27, 2003

(65) Prior Publication Data

US 2004/0268141 A1 Dec. 30, 2004

(51) Int. Cl.
*H04L 9/00* (2006.01)
(52) U.S. Cl. ..................................... 713/164
(58) Field of Classification Search ............. 726/4–10, 726/26–30, 34–36; 713/1–2, 166–167, 189–190
See application file for complete search history.

(56) References Cited

U.S. PATENT DOCUMENTS

| 5,287,487 A | 2/1994 | Priem et al. |
| 5,444,850 A | 8/1995 | Chang et al. |
| 5,694,568 A | 12/1997 | Harrison et al. |
| 6,047,359 A | 4/2000 | Fouts et al. |
| 6,134,643 A | 10/2000 | Kedem et al. |
| 6,134,710 A | 10/2000 | Levine et al. |
| 6,463,535 B1 | 10/2002 | Drews |
| 6,560,706 B1 | 5/2003 | Carbajal et al. |
| 2003/0061497 A1 | 3/2003 | Zimmer |
| 2003/0084342 A1 | 5/2003 | Girard |
| 2003/0126591 A1 | 7/2003 | Wu et al. |

FOREIGN PATENT DOCUMENTS

WO    WO 00/48061    8/2000

OTHER PUBLICATIONS

Extensible Firmware Interface Specification, Intel Corporation, Version 1.10, Dec. 1, 2002, 1084 pages.
Extensible Firmware Interface Specification, Version 1.10, Specification Update, Intel Corporation, Version -001, Nov. 26, 2003, 63 pages.
PCT Internationnal Preliminary Report on Patentability for application serial No. PCT/US2004/019255, Jan. 3, 2006, 6 pages.
James H. Burrows, *Announcing the Standard for Secure Hash Standard*, Federal Information Processing Standards Publication 180-1, Apr. 17, 1995, [on line] [retrieved on Apr. 19, 2004 from the Internet:<URL: http://www.itl.nist.gov/fipspubs/fip180-1.htm>]. 16 pages.

(Continued)

*Primary Examiner*—Nasser Moazzami
*Assistant Examiner*—Chinwendu C Okoronkwo
(74) *Attorney, Agent, or Firm*—Hanley Flight & Zimmerman, LLC (57) ABSTRACT

Methods and apparatus to provide secure firmware storage and service access are disclosed. One example method may include receiving a request to execute an instruction in a pre-boot environment, determining an identity of the instruction, determining if an access control list includes an entry corresponding to the instruction, and selectively allowing the execution of the instruction if the access control list includes an entry corresponding to the instruction.

23 Claims, 5 Drawing Sheets

OTHER PUBLICATIONS

James H. Burrows, *Announcing the Standard for Digital Signature Standard (DSS)* Federal Information Processing Standards Publication 186, May 19, 1994, [on line] [retrieved on Apr. 19, 2004 from the Internet:<:URL: http://www.itl.nist.gov/fipspubs/fip186.htm>]. 16 pages.

Carl M. Ellison, *Home Network Security*, Intel Technology Jurnal, vol. 6, No. 4, Nov. 15, 2002, [on line] [retrieved on Apr. 19, 2004 from the Internet:<URL: http://www.intel.com/technology/itj/2002/volume06issue04/art04_security/p01_abstract.htm>]. Section 1-15, 36 pages.

*Extensible Firmware Interface*, Intel Corporation-overview, [on line] [retrieved on Apr. 19, 2004 from the Internet:<URL:http://www.developer.intel.com.technology/efi/>]. 2 pages.

*Microsoft Portable Executable and Common Object File Format Specification*, Microsoft Corporation, Revision 6.0-Feb. 1999, 76 pages.

Internation Search Report for PCT Application Serial No. PCT/US2004/014845, Mar. 21, 2005, 4 pages.

Written Opinion of the International Searching Authority for PCT Application Serial No. PCT/US2004/014845, Mar. 21, 2005, 7 pages.

PCT International Search Report for application serial No. PCT/US2004/019255, Mar. 3, 2005, 4 pages.

PCT Written Opinion of the International Searching Authority for application serial No. PCT/US2004/019255, Mar. 3, 2005, 5 pages.

METHODS AND APPARATUS TO PROVIDE SECURE FIRMWARE STORAGE AND SERVICE ACCESS

TECHNICAL FIELD

The present disclosure pertains to firmware and, more particularly, to methods and apparatus to provide secure firmware storage and service access.

BACKGROUND

Computing systems include hardware, such as a processor, on which software or firmware is executed. When a processor is powered-up or receives a reset signal, the processor executes a boot sequence during which numerous instructions in firmware are executed in a pre-boot environment (i.e., an environment in which no operating system (OS) has been loaded).

As computing systems have evolved, the pre-boot environment has progressed from a crude interface having limited services to a standards-based interface in which firmware components are modular. One example of such a firmware arrangement is the extensible firmware interface (EFI), which provides a rich, heterogeneous set of services that are callable by various system entities to request execution, to invoke services, etc. For example, the EFI includes a set of core services that are made available through a system table that publishes the address at which various services reside so that the services may be called. Additionally, the EFI includes the ability to install interfaces, such as protocols, via a global unique identifier (GUID)/pointer pair.

The extensibility of modern firmware, such as EFI, which allows the addition of interfaces, along with the fact that most firmware systems leave variable stores and file systems unprotected, leaves modern firmware open to security attacks from viruses and the like. For example, the exposure of the flat namespace of callable interfaces that are listed in a system table creates new issues for establishing trust relationships among various executable entities. In particular, known pre-boot firmware environments do not perform authentication (i.e., confirming the identity of the entity requesting services) or authorization (i.e., determining the rights of the service requester).

DETAILED DESCRIPTION

Although the following discloses example systems including, among other components, software or firmware executed on hardware, it should be noted that such systems are merely illustrative and should not be considered as limiting. For example, it is contemplated that any or all of these hardware, firmware and/or software components could be embodied exclusively in dedicated hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
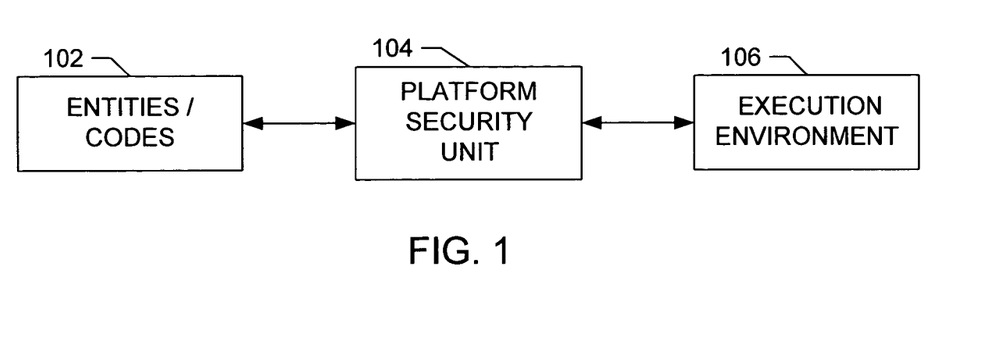
FIG. 1 is a diagram of an example secure firmware storage and service access system.

As shown in the example of FIG. 1, a secure firmware storage and service access system 100 includes entities and/or codes 102 that make service requests and/or requests to load code via a platform security unit 104 to an execution environment 106. In general, requests for services posed by the entities and/or codes 102 were formerly routed directly to the execution environment 106 where the requests for services were carried out. In contrast, in the disclosed system 100 the entities and codes are instrumented to make requests for services to the platform security unit 104 for authorization to carry out their desired task. For example, a LoadImage( ) service of EFI1.02 is instrumented to reference the platform security unit 104 when a driver or application (i.e., more generally code) is discovered in flash memory, on a local disk partition or on a network boot server. Additionally, if a known entity attempts to locate a service though the EFI1.10 service OpenProtocol( ) or the EFI1.02 service HandleProtocol( ), the security platform unit 104 will determine if the referenced protocol is authorized to be carried out. As a further example and as described below, variables may be hardened by specifying in the platform security unit 104 the GetNextVariable( ) and SetVariable( ) services in a RuntimeServicesMask stored within the platform security unit 104. While the foregoing services have been listed as examples of services, entities, and/or code that are instructed to access the platform security unit 104 for authentication and authorization, it should be noted that the above examples are merely illustrative. For example, all core services within the EFI and/or any other interface may have authorization decisions made by the platform security unit 104.

As described in detail below, the platform security unit 104 determines the identity of an entity requesting service and/or the identity of code that has been requested to be loaded (authentication) and determines the rights the requester or the code to be loaded has been granted (authorization). In particular, the code to be executed will have a Kobject (Kobj), which could be its public key, an SHA-1 hash of the image, salted password, or any other identifier that uniquely identifies that code. Within the platform security unit 104 there is an enumeration that describes "what" the calculation of K entails and a description of how to perform the calculation. A system administrator, referred to herein as Kowner, provisions the platform regarding what code objects (Kobj's) can be executed and what the permissions of each Kobj will have after execution, which is defined by pre-boot or runtime masks. For example, if a Kobj is authenticated and run, the Kobj will only be able to carry out tasks consistent with that Kobj's permissions. In the alternative, if the Kobj is unknown (i.e., is not listed in a database of Kobj's and, therefore, does not authenticate), the Kobj will not be loaded or run and the Kobj's request for execution resources, which was denied, will be logged.

Figure 2:
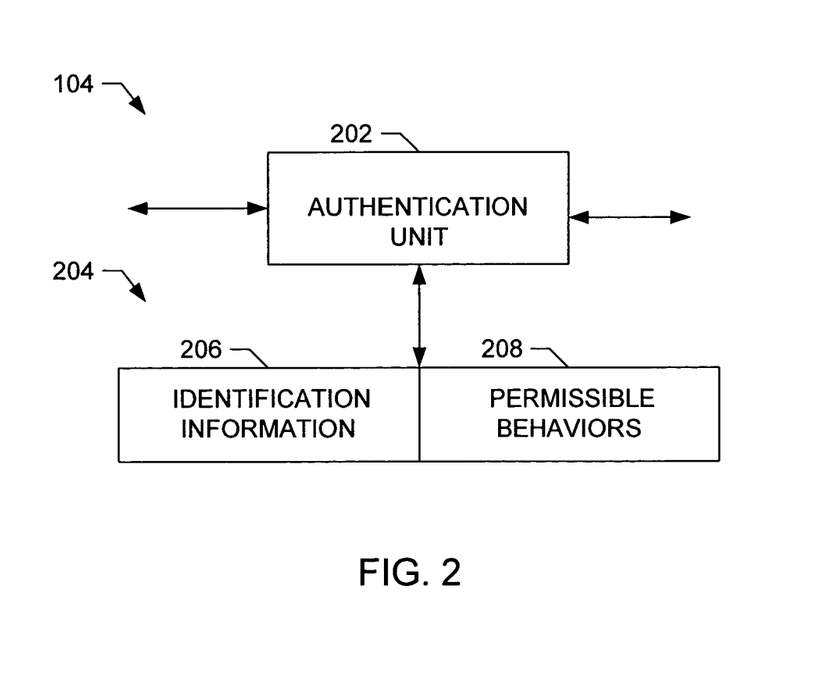
FIG. 2 is a diagram showing additional detail of an example platform security unit of FIG. 1.

As shown in FIG. 2, in one example, the platform security unit 104 may be implemented by an authentication unit 202 that is coupled to an access control list 204 that may include identification information 206 and permissible behaviors 208 corresponding to the entities listed in the identification information 206. The access control list 204 may be edited through a locally-hosted management interface including an access control list editor, or may be edited across a network using a secure transport and remote console.

As described in detail below in conjunction with FIG. 5, various entities in a particular system may be named according to a naming convention that drives the relationship of information contained in a database storing the identification information 206 and the permissible behaviors 208. Briefly, the identification information 206 may be, for example, an Ethernet MAC address, a salted password, a public key, an Internet protocol (IP) address, a symmetric key, a SHA-1 hash of a portable executable (PE) file (e.g., as defined at http://www.microsoft.com/whdc/hwdev/hardware/pe-coff.mspx), or any other suitable unique identification information.

In an EFI system, the permissible behaviors 208 corresponding to the identification information may be represented by boot service and runtime service bit masks, which are defined in Chapter 3 of the Extensible Firmware Interface (EFI) specification, version 1.02, published Dec. 12, 2000, which is available from Intel Corporation. Additionally, the permissible behaviors 208 may include a possibly empty list of protocols or services that may be invoked.

In general, during operation the authentication unit 202 receives a request for services from an entity and identifies the requesting entity. After the entity is identified, the identification information 206 is scanned for an entry corresponding to the identified entity. If an entry for the identified entity is found in the identification information 206, bit masks of available services are found for the entity in the permissible behaviors 208. The requested behavior may be carried out if permitted by the bit masks. In the alternative, if no entry is found in the identification information 206, the request may be denied its requested service. In the alternative, as described in further detail below, the request may be processed in a limited manner depending on the nature of the request.

The foregoing description describes various functionalities as being associated with blocks to form the platform security unit 104 of FIG. 1; however, the functionality of the platform security unit 104 can be implemented by software or firmware that is executed by one or more processor systems. In one example, an example processor system 300 such as that shown in FIG. 3 may be used to implement one or more processes to form a platform security unit. Further details regarding instructions, data structures, etc. that may be used in conjunction with processor systems to provide platform security are provided below following a description of the example processor system 300.

Figure 3:
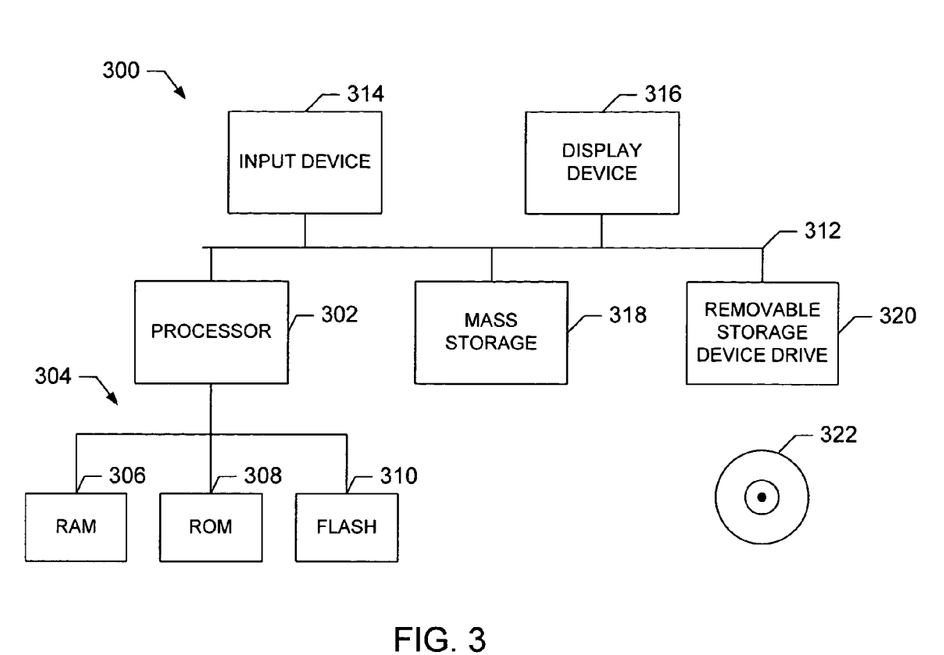
FIG. 3 is a diagram of an example processor system on which the example secure firmware storage and service access system may be implemented.

The example processor system 300 includes a processor 302 having associated memories 304, such as a random access memory (RAM) 306, a read only memory (ROM) 308 and a flash memory 310. The processor 302 is coupled to an interface, such as a bus 312 to which other components may be interfaced. In the illustrated example, the components interfaced to the bus 312 include an input device 314, a display device 316, a mass storage device 318 and a removable storage device drive 320. The removable storage device drive 320 may include associated removable storage media 322, such as magnetic or optical media.

The example processor system 300 may be, for example, a conventional desktop personal computer, a notebook computer, a workstation or any other computing device. Additionally, the example processor system 300 may be implemented using a digital signal processor (DSP)-based architecture. In a DSP-based architecture, some of the components interfaced to the bus may be eliminated.

The processor 302 may be any type of processing unit, such as a microprocessor, a microcontroller, a DSP or custom hardware, such as an application-specific integrated circuit.

The memories 306-310 that are coupled to the processor 302 may be any suitable memory devices and may be sized to satisfy the storage demands of the system 300. The memories 306-310 may store, for example, instructions that implement the functionality described below. The processor 302 may recall such instructions from the memory 304 for execution.

The input device 314 may implemented using a keyboard, a mouse, a touch screen, a track pad or any other device that enables a user to provide information to the processor 302. Alternatively, the input device 314 may be a network connection or an input port that may receive and transmit information to and from the processor 302.

The display device 316 may be, for example, a liquid crystal display (LCD) monitor, a cathode ray tube (CRT) monitor or any other suitable device that acts as an interface between the processor 302 and a user. The display device 316, as pictured in FIG. 3, includes any additional hardware required to interface a display screen to the processor 302.

The mass storage device 318 may be, for example, a conventional hard drive or any other magnetic or optical media that is readable by the processor 302. Additionally, although shown as being local to the system 300, the mass storage device 318 may be located remotely from the system 300 and, therefore, may be coupled to the system 300 via the input device 314.

The removable storage device drive 320 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 322 is complimentary to the removable storage device drive 320, inasmuch as the media 322 is selected to operate with the drive 320. For example, if the removable storage device drive 320 is an optical drive, the removable storage media 322 may be a CD-R disk, a CD-RW disk, a DVD disk or any other suitable optical disk. On the other hand, if the removable storage device drive 320 is a magnetic media device, the removable storage media 322 may be, for example, a diskette or any other suitable magnetic storage media.

As will be readily appreciated by those having ordinary skill in the art, some components of the system 300 may be omitted in certain implementations. For example, the display device 316, the mass storage device 318 and the removable storage device drive 322 are examples of components that may be omitted.

Figure 4:
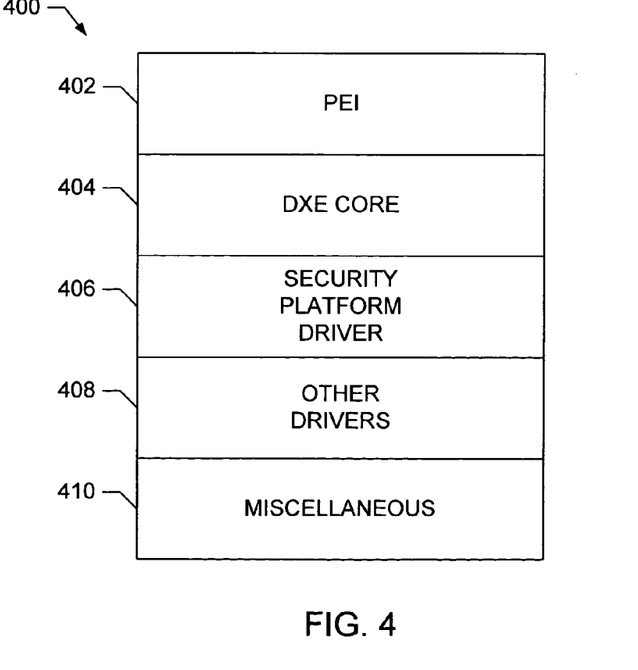
FIG. 4 is a diagram of an example flash map of instructions that may be loaded into the flash memory of FIG. 3.

As shown in the example flash map 400 of FIG. 4, various code segments or portions of code may be implemented in flash memory (e.g., the flash memory 310 of FIG. 3) as firmware. As shown in the flash map of FIG. 4, the flash memory includes a trusted computing base (TCB) that is formed by a pre-EFI initialization (PEI) portion 402, a driver execution environment (DXE) core 404, and a security platform driver 406, which may implement the functionality described in conjunction with the platform security unit 104 of FIG. 1. Additionally, as represented by the flash map 400, the flash memory may store other drivers 408 and other miscellaneous information 410. Generally, as described in detail below, the TCB of the PEI 402, the DXE core 404 and the security platform driver 406 is first executed by a processor. Subsequently, requests for services made to the processor are handled by the previously-installed platform security driver 406. As generally described above with respect to the platform security unit 104 of FIG. 1, the security platform driver 406 authenticates the identity of any service or resource requester and determines if the requester is authorized to receive the service requested. Further detail pertinent to the operational aspects of the security platform driver 406 is provided below with respect to a security platform process described in conjunction with FIG. 6.

In operation, when the processor 302 is reset, the processor 302 begins execution at a memory location indicated by a reset vector. The reset vector, in the disclosed example points to the top line of code in the flash map 400. Accordingly, a processor (e.g., the processor 302 of FIG. 3) begins serially executing the code represented by the top of the flash map 400 and continues executing code until code representing the bottom of the flash map 400 is executed. The PEI 402 is the first code that is loaded and executed by the processor 302. As will be readily appreciated by those having ordinary skill in the art, the PEI 402, among other functions, initializes the processor memory 304 for execution of code that follows the PEI 402.

After the PEI 402 is loaded and executed, the processor 302 proceeds to load and execute the DXE core 404, which, as will be readily appreciated by skilled artisans, is an execution environment in which drivers may be loaded and executed. For example, with reference to FIG. 1, the execution environment 106 may be implemented using the DXE core 404.

After the DXE core 404 has been loaded and executed, the security platform driver 406, which is the last item in the TCB is loaded and executed. Again, with reference to FIG. 1, the platform security unit 104 may be implemented by the security platform driver 406. As described herein, the security platform driver 406 receives requests for resources or services and selectively grants permission to the requests or services based on the identity of the requester and/or the nature of the request or service desired. In general, the security platform driver 406 determines the identity of the requester (authentication) and determines the services available to the requester (authorization).

After the security platform driver 406 is loaded and executed, other drivers 408 and miscellaneous instructions may be loaded and executed, if such drivers and instructions pass the authentication and authorization tests performed by the security platform driver 406.

Figure 5:
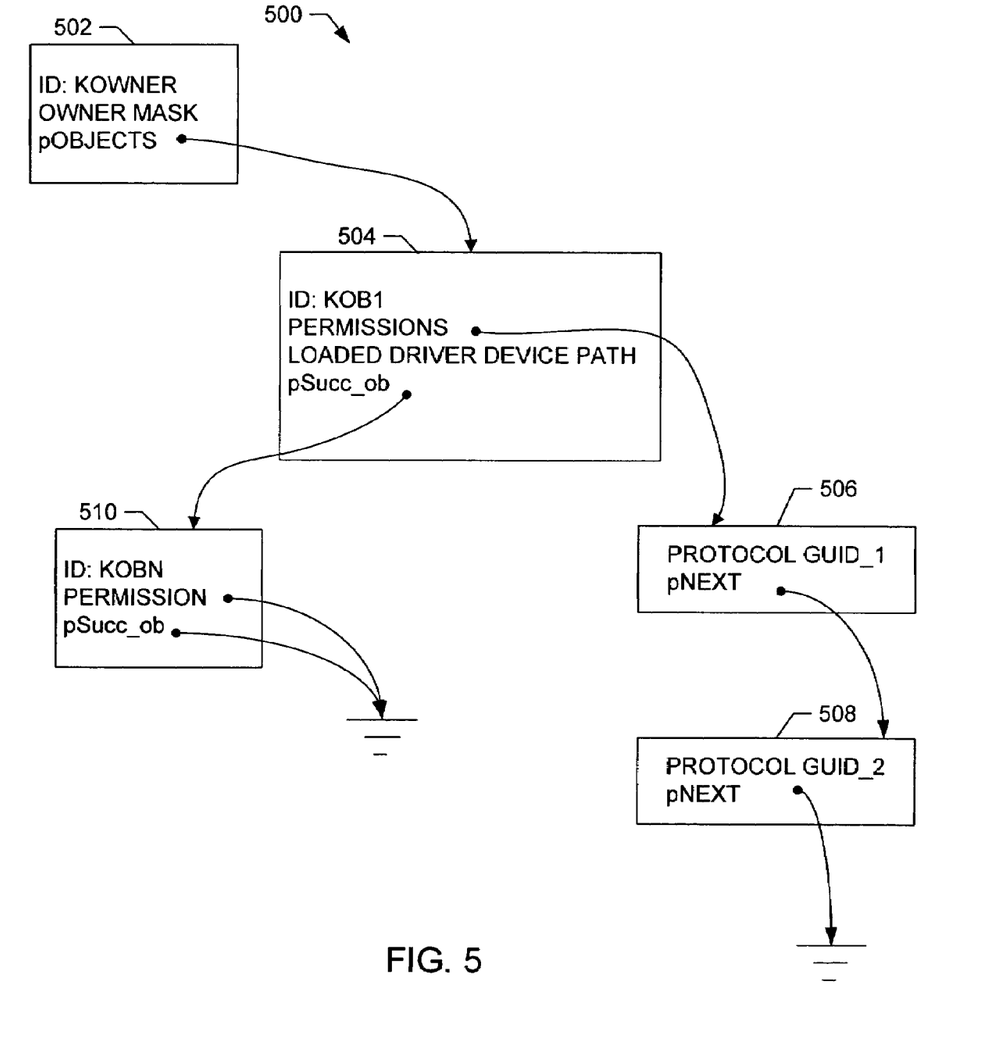
FIG. 5 is a diagram of an example authorization database relationship.
Figure 6:
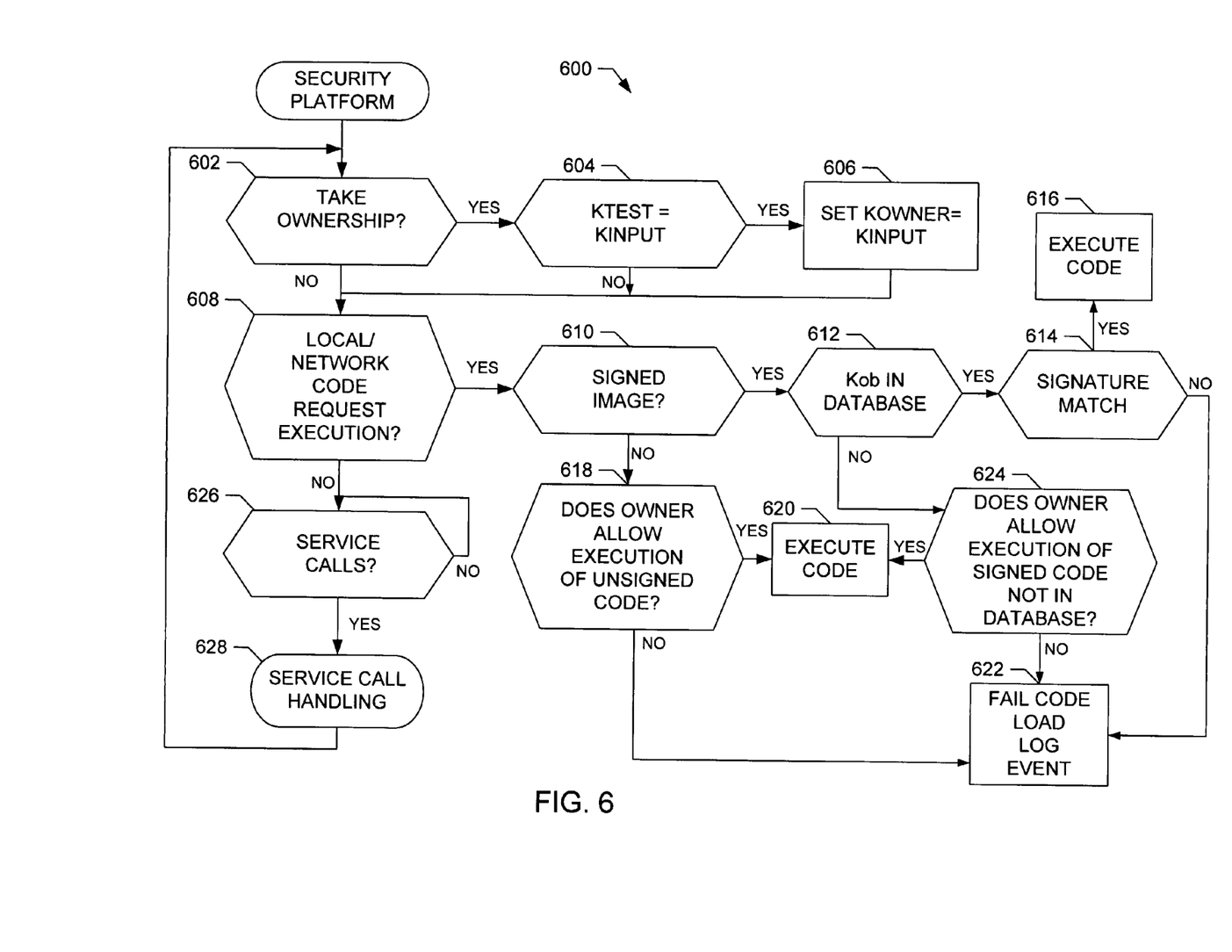
FIG. 6 is a flow diagram of an example security process that may be implemented on the example processor system of FIG. 3.
Figure 7:
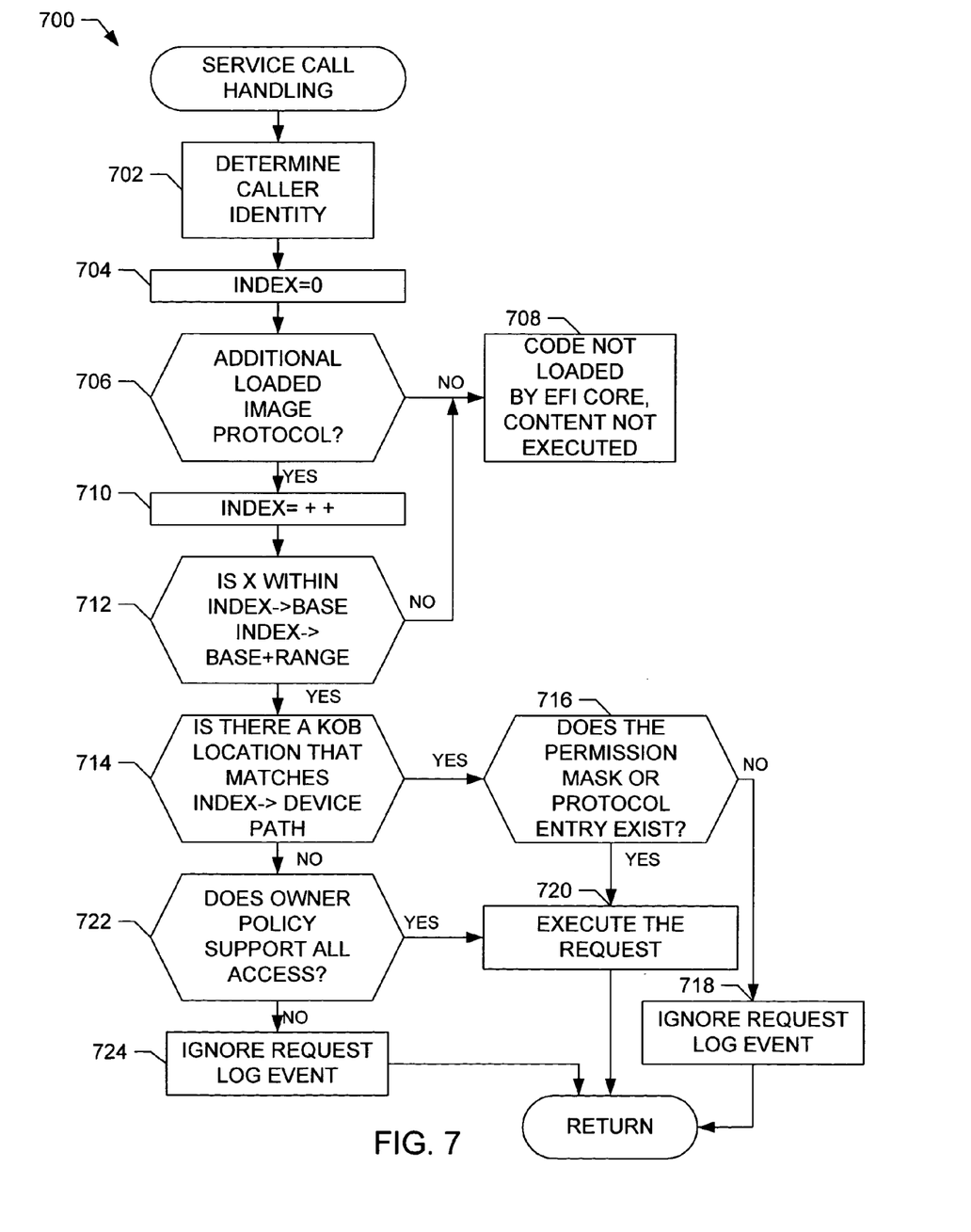
FIG. 7 is a flow diagram of an example service call handling process that may be implemented on the example processor system of FIG. 3.

To facilitate the explanation of FIGS. 6 and 7, an example authorization database relationship 500 is shown and described in conjunction with FIG. 5. The authorization database relationship 500 includes an owner object 502, an object one 504, first and second protocol GUID objects 506 and 508, and an $n^{th}$ object 510. The objects 502, 504, and 510 are identified and referred to by unique identifiers (Ks), which may be, for example, Ethernet MAC addresses, salted passwords, public keys, IP addresses, symmetric keys, SHA-1 hashes, or other unique information.

The owner object 502 in the example of FIG. 5 is named Kowner and has an owner mask that defines the attributes of the owner. For example, the owner mask may define the runtime and pre-boot execution services that are available to the owner object 502. The owner object 502 also includes a reference to other objects to which it is related. For example, as shown in FIG. 5, the owner object 502 refers to the object one 504, which is named Kob1. For example, in a factory scenario in which an original equipment manufacturer (OEM) is setting up a processor system (e.g., the processor system 300 of FIG. 3), the OEM may install a Kowner and possibly some objects related to the Kowner object, wherein the Kowner and related objects provide support for OEM diagnostics and various boot loaders.

The object one 504 refers to the first protocol GUID 506 for a definition of the permissions related to the one object 504. The first protocol GUID 506 may further refer to the second protocol GUID 508 for definitions of further services that may be available to the one object 504. The second protocol GUID 508 may refer to further GUIDs. In the alternative, as shown in FIG. 5, the second protocol GUID 508 may refer to no further GUIDs.

The object one 504 may also refer to subsequent objects, like the $n^{th}$ object 510. The $n^{th}$ object 510 includes permissions that may be defined as services masks for pre-boot and runtime and may also list successor objects. In the example of FIG. 5, however, the $n^{th}$ object 510 does not list successor objects.

An example security platform process 600 is illustrated in FIG. 6. The security platform process 600 may be implemented using one or more software programs or sets of instructions that are stored in one or more memories (e.g., the memories 306-310) and executed by one or more processors (e.g., the processor 302). However, some or all of the blocks of the platform security process 600 may be performed manually and/or by some other device. Additionally, although the platform security process 600 is described with reference to the flowchart illustrated in FIG. 6, persons of ordinary skill in the art will readily appreciate that many other methods of performing the platform security process 600 may be used. For example, the order of the blocks may be altered, the operation of one or more blocks may be changed, blocks may be combined, and/or blocks may be eliminated.

In general, the platform security process 600 requests for service, such as, for example, requests to load or execute code, requests to perform services in the pre-boot or in runtime, etc. and determines if specified security rules are being obeyed if such a request is fulfilled. In particular, the platform security process 600 performs authentication (i.e., determining the identity of the requesting entity) and authorization (i.e., determining the rights of the authenticated requesting entity). Based on the authentication and authorization, the platform security process will selectively allow the fulfillment of a request.

The platform security process 600 begins by determining if an entity is attempting to take ownership of the system (block 602). For example, when a user purchases a new personal computer, the user may input a default username and password to assert the right to change various system parameters, one or more of which may pertain to security settings and the permissions to execute various instructions or to provide various services.

If an entity is attempting to take ownership (block 602), the password input by the entity (Kinput) is compared to the test password (Ktest) (block 604). For example, a password may be a simple hash of a particular alpha and or numeric character string. In such a case, if the hash of the password input by the entity matches a hash of the password stored in memory (e.g., any of the memories 306-310), the identity of the owner is set to be the identity entity that provided the proper password (block 606). After entering the proper password (i.e., after becoming the owner), the entity may make changes to various aspects of the security settings of the system. For example, an owner may set security parameters to enable or disable the execution of unsigned code. Additionally, the owner may enable or disable the ability to perform services for entities not listed in a platform security database that may be located within one or more of the memories 306-310. All of these functions may be performed within the block 606 of the example of FIG. 6.

After the process 600 has completed the execution of the block 606, if the password input does not equal the stored password (block 604), or if ownership is not being taken (block 602), the process 600 determines if a request for execution has been received (block 608). Requests for execution may include requests received locally or from a network or from any other source. The request may be a request to carry out the execution of a driver, an application, and/or any other instruction or collection of instructions. In addition, the request may include a request to load a distinguished EFI application that is an OS Loader. The system can be configured such that the OwnerMask dictates that the platform requires a "Secure Boot." In this mode of operation, there must be a Kobj that corresponds to the Image on disk or loaded across the network that corresponds to the OS Loader stipulated by the EFI environment variable Boot-Next. In absence of a Kobj for the OS Loader, the system shall go into some recovery mode.

If there is a request for execution (block 608), the process 600 determines if the code for execution, which may be referred to as an image, is a signed image (block 610). An image may be referred to as signed if the image includes a signature, such as a digital signature like a hash or some other suitable signature. As will be readily appreciated by those having ordinary skill in the art, information may be hashed and signed with a private key before the information is transmitted. Upon receiving signed information, the receiver of the information will attempt to verify the integrity of the received information with a public key associated with the private key used to send the information and then hashes the information to obtain the originally hashed information. Using such an arrangement, a driver may be signed at a factory and the platform security driver may authenticate the driver contents when the driver is to be executed. Additional information pertinent to hashes may be found at, for example, http://csrc.nist.gov/publications/fips/fips180-1/fip180-1.txt. Additional information pertinent to signing images, such as drivers, with a public/private key pair may be found at, for example, http://www.itl.nist.gov/fipspubs/fip186.htm.

If the image is signed (block 610), the process 600 determines if the object requesting resources (e.g., Kobject) is located in the database (e.g., the access control list 204 of FIG. 4) (block 612). If an entry corresponding to the object is found in the database (block 612), the process determines if the signature attached to the object matches the signature of the object that is located in the database (block 614). If the signatures match, the driver is executed (block 616).

Returning to the discussion of the process 600 pertinent to block 610, if the image is not signed (block 610), the process determines if the owner allows the execution of unsigned code (block 618). If the owner allows execution of unsigned code (block 618), the process executes the code (block 620). Alternatively, if the owner does not permit the execution of unsigned code (block 618), the attempted loading of the code fails and the failure is logged (block 622).

Returning to block 612, if the object is not in the database (block 612), the process 600 determines if the owner allows execution of unsigned code that is not in the database (block 624). If the owner allows the execution of such code, the code is executed (block 620). Alternatively, if the owner does not allow the execution of such code, loading of the code fails and the failure is logged (block 622).

If the process 600 determines that the signatures of the code and database do not match for a particular object (block 614), the loading fails and the failure is logged (block 622).

Returning to block 608, if the process 600 does not receive any execution request, the process 600 determines if any service calls are received (block 626). The block 626 retains control until a request for a service call is received. When a service call is received, a service call handing process is called (block 628) and control passes thereto. Further detail pertinent to the service call handling process (block 628) is provided in conjunction with FIG. 7.

An example service call handling process 700, which may be used to implement the block 700, is illustrated in further detail in FIG. 7. As with the security platform process 600, the service call handling process 700 may be implemented using one or more software programs or sets of instructions that are stored in one or more memories (e.g., the memories 306-310) and executed by one or more processors (e.g., the processor 302). However, some or all of the blocks of the service call handling process 700 may be performed manually and/or by some other device. Additionally, although the service call handling process 700 is described with reference to the flowchart illustrated in FIG. 7, persons of ordinary skill in the art will readily appreciate that many other methods of performing the service call handling process 700 may be used. For example, the order the blocks may be altered, the operation of one or more blocks may be changed, blocks may be combined, and/or blocks may be eliminated. Furthermore, while the processes 600 and 700 are shown as being separate diagrams, those having ordinary skill in the art will readily recognize that the two processes could be combined and represented in a single diagram.

In general, the service call handling process 700 processes service call requests, which may be boot service requests, runtime service requests and/or protocols, in a secure manner. In particular, the process 700 determines the identity of a caller requesting service and determines if the requested image is found in the database. The process 700 then determines if the permission mask or protocol entry exists and/or if the owner policy supports all access. Based on the existence of the protocol mask and/or an all-access policy, the service request may be executed or ignored.

The process 700 begins execution by determining the identity of the caller that requested the service (block 702). The identity of the caller can be determined by correlating the loaded image protocol instances with the Kobject. In one particular example, each loaded image protocol will have ImageBase field that stipulates the base of the image in memory; the size of the image in memory shall be defined by the ImageSize field of the loaded image protocol instance. In such an arrangement, the platform security driver examines the call stack return value and determines if this call-stack address is within any (ImageBase, ImageBase+ImageLength) regime. If so, the EFI_DEVICE_PATH FilePath field can be used to check the EFI_DEVICE_PATH instances in the Kobj's nodes and attempt to find a match. This is one technique by which a call stack return address into a caller/driver can be correlated with a Kobj.

After the identity of the caller is determined (block 702), the process 700 determines if the image exists in the database (e.g., the access control list 204) by resetting an index to zero (block 704). After the index is reset, the process 700 determines if an additional loaded image protocol exists (block 706). If no loaded image protocol exists (block 706), the code is not loaded by the EFI core and, therefore, is not executed (block 708).

Alternatively, if an additional image protocol does exist (block 706), the index is incremented (block 710). It is then determined if a variable X is between a base address and a base address incremented by a range (block 712). If the variable X is not between the base and the base incremented by the range, the code is not loaded by the EFI core and the content is not loaded (block 708).

Alternatively, if the variable X is within range, the process 700 determines if there is an object location that matches the index of the device path (path 714), which indicates whether the object exists in a proper location in memory. If the object does exist, the process 700 determines if a permission mask or a protocol entry exists (block 716). If a permission mask or a protocol does not exist (block 716), the request is ignored and the event is logged (block 718). Conversely, if the permission mask or the protocol exists (block 716), the request is executed (block 720). After either the request is ignored or executed (blocks 718 or 720), the process 700 returns control to the process 600, which continues execution until an exit boot services command is received to commence loading of an operating system and ceasing of the pre-boot environment.

If there is no corresponding object in memory (block 714), the process 700 determines if the owner policy supports all access (block 722). If the owner policy supports all access (block 722), the request is executed (block 720). Alternatively, if the owner policy does not support all access, the request is ignored and the event is logged (block 724) before control is returned to the process 600.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of controlling access to execution resources comprising:
    receiving a request to execute an instruction in a pre-boot environment;
    determining an identity of the instruction;
    determining if an access control list includes an entry corresponding to the instruction; and
    selectively allowing the execution of the instruction if the access control list includes an entry corresponding to the instruction.

2. A method as defined by claim 1, further including allowing the execution of the instruction if a signature in the access control list matches a signature of the instruction.

3. A method as defined by claim 1, including selectively allowing the execution of the instruction if the access control list does not include an entry corresponding to the instruction if the instruction is signed.

4. A method as defined by claim 1, wherein the instruction is requested by a service call to be executed.

5. A method as defined by claim 4, including determining from the access control list system resources that may be used by the instruction.

6. A method as defined by claim 4, including determining an identity of an entity making the service call.

7. A method as defined by claim 4, including determining if the instruction to be executed is within a predefined area of memory.

8. A method as defined by claim 1, wherein the instruction is an operating system loader that dictates a secure boot and wherein a recovery mode of operation is entered if the access control list does not include an entry corresponding to the instruction.

9. An article of manufacture comprising a machine-accessible medium having a plurality of machine accessible instructions that, when executed, cause a machine to:
    receive a request to execute an instruction in a pre-boot environment;
    determine an identity of the instruction;
    determine if an access control list includes an entry corresponding to the instruction; and
    selectively allow the execution of the instruction if the access control list includes an entry corresponding to the instruction.

10. A machine-accessible medium as defined by claim 9, wherein the plurality of machine accessible instructions, when executed, cause a machine to allow the execution of the instruction if a signature in the access control list matches a signature of the instruction.

11. A machine-accessible medium as defined by claim 9, wherein the plurality of machine accessible instructions, when executed, cause a machine to selectively allow the execution of the instruction if the access control list does not include an entry corresponding to the instruction if the instruction is signed.

12. A machine-accessible medium as defined by claim 9, wherein the instruction is requested to be executed by a service call.

13. A machine-accessible medium as defined by claim 9, wherein the plurality of machine accessible instructions, when executed, cause a machine to determine from the access control list system resources that may be used by the instruction.

14. A machine-accessible medium as defined by claim 13, wherein the plurality of machine accessible instructions, when executed, cause a machine to determine an identity of an entity making the service call.

15. A machine-accessible medium as defined by claim 13, wherein the plurality of machine accessible instructions, when executed, cause a machine to determine if the instruction to be executed is within a predefined area of memory.

16. A machine-accessible medium as defined by claim 9, wherein the instruction is an operating system loader that dictates a secure boot and wherein a recovery mode of operation is entered if the access control list does not include an entry corresponding to the instruction.

17. A system comprising:
    an execution environment configured to execute code;
    a instruction to be executed;
    a platform security unit coupled to the execution environment and to receive a request to execute the instruction in a pre-boot environment, wherein the platform security unit is configured to: determine an identity of the instruction, determine if an access control list includes an entry corresponding to the instruction, and selectively allow the execution of the instruction by the execution environment if the access control list includes an entry corresponding to the instruction.

18. A system as defined by claim 17, wherein the platform security unit allows the execution of the instruction by the execution environment if a signature in the access control list matches a signature of the instruction.

19. A system as defined by claim 17, wherein the platform security unit selectively allows the execution of the instruction by the execution environment if the access control list does not include an entry corresponding to the instruction if the instruction is signed.

20. A system as defined by claim 17, wherein the instruction is requested by a service call to be executed.

21. A system as defined by claim 20, wherein the platform security unit determines from the access control list system resources that may be used by the instruction.

22. A system as defined by claim 20, wherein the platform security unit determines an identity of an entity making the service call.

23. A system as defined by claim 20, wherein the platform security unit determines if the instruction to be executed is within a predefined area of memory.

* * * * *